(12) United States Patent
Haidet

(10) Patent No.: US 10,532,611 B2
(45) Date of Patent: Jan. 14, 2020

(54) TIRE AND WHEEL ASSEMBLY HAVING ANGLED INTERFACES

(71) Applicant: Bridgestone Americas Tire Operations, LLC, Nashville, TN (US)

(72) Inventor: Andrew V. Haidet, Silver Lake, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 149 days.

(21) Appl. No.: 15/538,793

(22) PCT Filed: Dec. 8, 2015

(86) PCT No.: PCT/US2015/064507
§ 371 (c)(1),
(2) Date: Jun. 22, 2017

(87) PCT Pub. No.: WO2016/105933
PCT Pub. Date: Jun. 30, 2016

(65) Prior Publication Data
US 2017/0368880 A1    Dec. 28, 2017

Related U.S. Application Data

(60) Provisional application No. 62/095,460, filed on Dec. 22, 2014.

(51) Int. Cl.
*B60C 7/26* (2006.01)
*B60C 17/04* (2006.01)
(Continued)

(52) U.S. Cl.
CPC .............. *B60C 7/26* (2013.01); *B60C 17/041* (2013.01); *B29D 30/0681* (2013.01); *B60C 2007/107* (2013.01)

(58) Field of Classification Search
CPC ....... B60C 7/24; B60C 7/26; B60C 2007/146; B60C 17/041
(Continued)

(56) References Cited

U.S. PATENT DOCUMENTS

| 464,767 | A | * | 12/1891 | Woodward | B60C 7/12 |
| | | | | | 152/327 |
| 523,051 | A | * | 7/1894 | Penoyer | B60C 7/24 |
| | | | | | 152/385 |

(Continued)

FOREIGN PATENT DOCUMENTS

| EP | 0354625 | 2/1990 |
| EP | 0452628 | 10/1991 |

(Continued)

OTHER PUBLICATIONS

Bae, Guen Tae; International Search Report and Written Opinion of corresponding PCT Application No. PCT/US2015/064507; dated Mar. 28, 2016; Korean Intellectual Property Office; Daejeon, Republic of Korea.

(Continued)

*Primary Examiner* — Kip T Kotter
(74) *Attorney, Agent, or Firm* — Shaun J. Fox; Bryan Jaketic

(57) ABSTRACT

A tire is configured to be received by a wheel having at least one angled surface. The tire includes a tread portion, a first sidewall, and a second sidewall. The first sidewall has a first outer surface, a first inner surface, and a first projection extending inwardly from the first inner surface. The first projection has a first angled surface configured to engage a first corresponding surface of a wheel. The second sidewall has a second outer surface, a second inner surface, and a second projection extending inwardly from the second inner surface. The second projection has a second angled surface (Continued)

configured to engage a second corresponding surface of the wheel.

11 Claims, 4 Drawing Sheets

(51) Int. Cl.
*B60C 7/10* (2006.01)
*B29D 30/06* (2006.01)

(58) Field of Classification Search
USPC .............................................. 152/379.3, 385
See application file for complete search history.

(56) References Cited

U.S. PATENT DOCUMENTS

| | | | | | |
|---|---|---|---|---|---|
| 612,583 | A | * | 10/1898 | Davidson | B60C 15/024 |
| | | | | | 152/379.3 |
| 852,002 | A | * | 4/1907 | Smith | B60C 7/12 |
| | | | | | 152/329 |
| 895,301 | A | * | 8/1908 | Ritchie | B60C 7/12 |
| | | | | | 152/328 |
| 1,004,480 | A | * | 9/1911 | Seward | B60C 7/102 |
| | | | | | 152/305 |
| 1,122,875 | A | * | 12/1914 | Doty | B60C 7/10 |
| | | | | | 152/325 |
| 1,725,733 | A | * | 8/1929 | Harter | B60C 7/24 |
| | | | | | 152/375 |
| 4,170,254 | A | | 10/1979 | Jackson | |
| 5,494,090 | A | | 2/1996 | Kejha | |
| 2011/0240193 | A1 | | 10/2011 | Matsuda et al. | |
| 2012/0217790 | A1 | | 8/2012 | Gardetto | |

FOREIGN PATENT DOCUMENTS

| | | | |
|---|---|---|---|
| EP | 2062749 | 5/2009 | |
| FR | 2844479 A1 * | 3/2004 | ............... B60C 7/24 |
| KR | 10-2013-0128138 | 11/2013 | |
| WO | 2005063505 | 7/2005 | |

OTHER PUBLICATIONS

Massimiliano Flori; European Search Report of corresponding PCT European Application No. EP15874100; dated Nov. 9, 2017; European Patent Office; Munich.

* cited by examiner

TIRE AND WHEEL ASSEMBLY HAVING ANGLED INTERFACES

FIELD OF INVENTION

The present disclosure relates to a tire and wheel assembly. More particularly, the present disclosure relates to a non-pneumatic tire having angled surfaces that interface with corresponding angled surfaces of a wheel.

BACKGROUND

Non-pneumatic tire constructions enable a tire to run in an uninflated condition. Some non-pneumatic tires employ a unitary tire and wheel construction. Other non-pneumatic tires are fastened to wheels using fasteners such as bolts. Non-pneumatic tires may include spokes that buckle or deflect upon contact with the ground. Such spokes may be constructed of a material that is relatively stronger in tension than in compression, so that when the lower spokes buckle, the load can be distributed through the remaining portion of the wheel.

SUMMARY OF THE INVENTION

In one embodiment, a non-pneumatic tire and wheel assembly includes a non-pneumatic tire having a circumferential tread and a pair of spaced apart sidewalls extending downwardly from the circumferential tread. Each of the sidewalls has an outer surface, an inner surface, and a projection extending inwardly from the inner surface. The projection has an angled surface. The assembly further includes a wheel having a pair of sides. Each side includes an angled surface abutting the angled surface of the projection of a corresponding sidewall. The assembly also includes a plurality of fasteners. Each fastener extends through at least one sidewall and at least a portion of the wheel.

In another embodiment, a tire is configured to be received by a wheel having at least one angled surface. The tire includes a tread portion, a first sidewall, and a second sidewall. The first sidewall has a first outer surface, a first inner surface, and a first projection extending inwardly from the first inner surface. The first projection has a first angled surface configured to engage a first corresponding surface of a wheel. The second sidewall has a second outer surface, a second inner surface, and a second projection extending inwardly from the second inner surface. The second projection has a second angled surface configured to engage a second corresponding surface of the wheel.

In yet another embodiment, a non-pneumatic tire has a circumferential tread and a pair of sidewalls, including a first sidewall and a second sidewall. The non-pneumatic tire also has a first projection extending inwardly from the first sidewall. The first projection has a first angled surface configured to engage a wheel and transfer a first force having a radial component and an axial component. The non-pneumatic tire further has a second projection extending inwardly from the second sidewall. The second projection has a second angled surface configured to engage a wheel and transfer a second force having a radial component and an axial component.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire below the tread and defining a side of the tire.

"Tread" refers to that portion of the tire that comes into contact with a road or other rolling surface under normal load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 2:
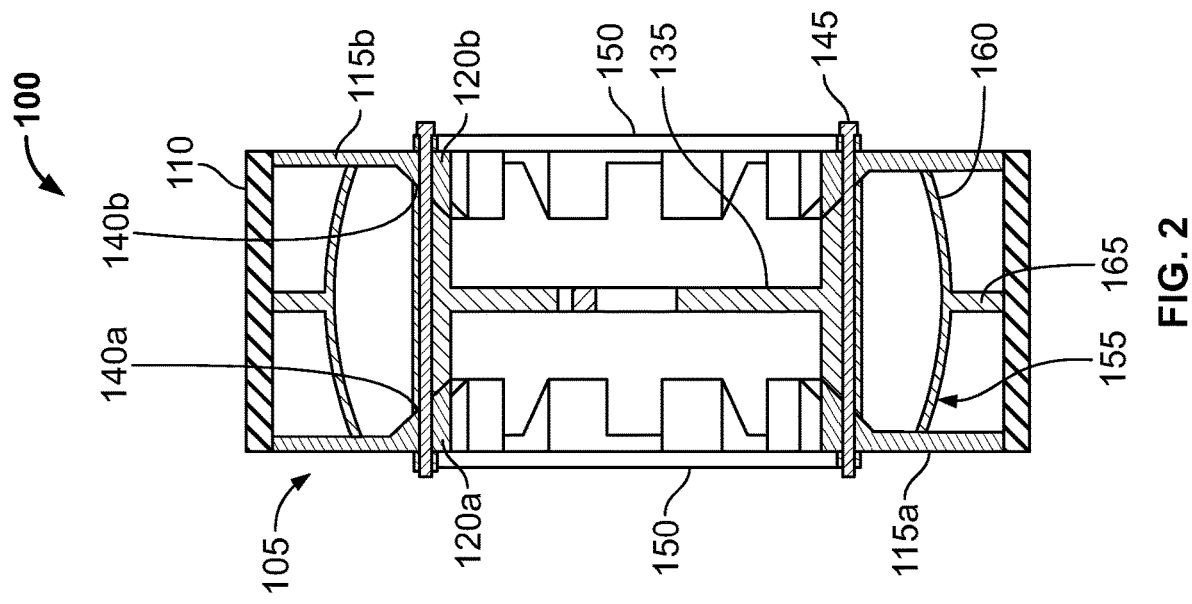
FIG. 2 is a cross-section of the tire and wheel assembly 100.
Figure 1:
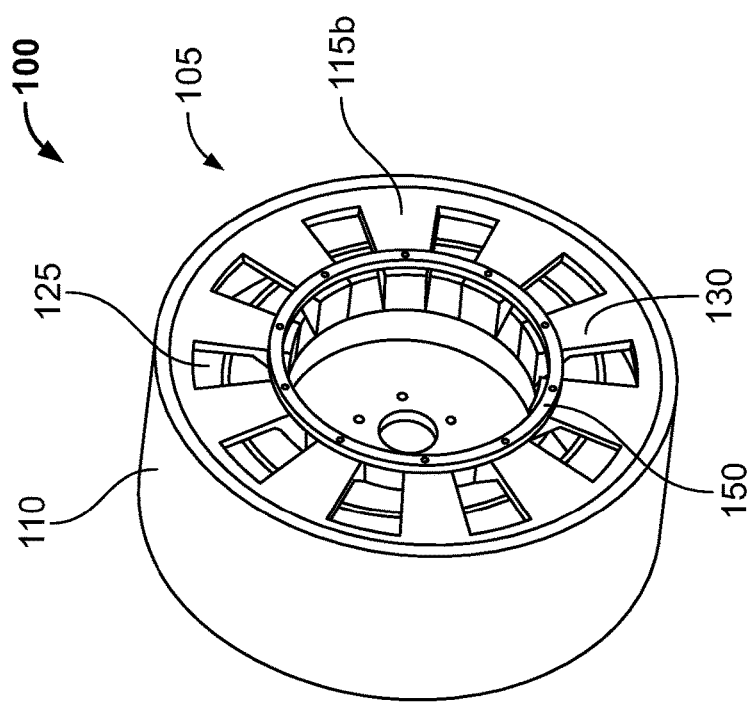
FIG. 1 is a perspective view of one embodiment of a tire and wheel assembly 100.

FIGS. 1 and 2 provide a perspective view and cross-section, respectively, of one embodiment of a tire and wheel assembly 100. The assembly 100 includes a tire 105 having a circumferential tread 110 and a pair of spaced apart sidewalls—including a first sidewall 115a and a second sidewall 115b—that extend downwardly from the circumferential tread 110. In one embodiment, the tread 100 is constructed of a flexible material, such as rubber, thermoplastics, resins, or elastomeric or polymeric material, and the sidewalls 115a,b are also constructed of a flexible material, such as polyurethane, thermoplastics, resins, or elastomeric or polymeric material. In an alternative embodiment (not shown), the tread and sidewalls are constructed of the same material.

In the illustrated embodiment, the sidewalls 115a,b are in direct contact with the tread 110. In an alternative embodiment (not shown), other components or layers of materials may be disposed between the tread and the sidewalls or embedded in the tread. For example, reinforcement structures may be disposed between the tread and the sidewalls. In one such embodiment, the reinforcement structures form a high annular strength band that acts as a structural compression member on the tire, and increases interlaminar shear strength across the axial length of the tire. The reinforcement structures may include inelastic outer portions that sandwich an elastic center portion. Other examples of high annular strength bands are discussed in U.S. Pat. No. 5,879,484, which is incorporated by reference herein in its entirety. The high annular strength band may also be referred to as a "shear band" or "band."

Each of the sidewalls 115a,b has an outer surface and an inner surface. A first projection 120a extends inwardly from the inner surface of the first sidewall 115a, and a second projection 120b extends inwardly from the inner surface of the second sidewall 115b. In the illustrated embodiment, the first projection 120a is substantially symmetric to the second projection 120b. In an alternative embodiment (not shown), the first projection and the second projection may have different shapes, sizes, or locations.

Both the first and second projections 120a,b have angled surfaces. In the illustrated embodiment, a lower end of each projection is longer than an upper end, and the angled surface of each projection extends smoothly from the lower end to the upper end. In an alternative embodiment (not shown), multiple angled portions may extend from the lower end to the upper end. In another alternative embodiment (not shown), one or more rounded or curved surface may extend from the lower end to the upper end.

The sidewalls 115a,b also include a plurality of openings 125. In the illustrated embodiment, the openings 125 are elongated openings spaced about each sidewall 115a,b and define a plurality of spokes 130 having free lower ends. Because the lower ends of the spokes 130 are not connected to each other, the spokes 130 are more flexible than if the lower ends were connected. In an alternative embodiment (not shown), the openings are cutouts, and the lower ends of the spokes are connected to each other. In another alternative embodiment (not shown), the openings are not spaced so as to define a plurality of spokes.

In the illustrated embodiment, each spoke 130 may be described as having a separate projection 120a,b. In other words, the first projection 120a and the second projection 120b may each be described as being a plurality of projections. Alternatively, the first and second projections 120a,b in the illustrated embodiment may each be referred to as being a single, non-continuous projection.

The assembly 100 also includes a wheel 135. The wheel 135 includes a first angled surface on a first side and a second angled surface on a second side. In the illustrated embodiment, the angled surfaces are tapers from a wide upper region to a narrow center region. A wheel with such a taper may be described as having a collet shape. In an alternative embodiment (not shown), the angled surface may define a groove in a wheel that otherwise has a substantially constant width.

The first angled surface of the wheel 135 interfaces with the angled surface of the first projection 120a of the tire 105 at a first interface 140a. Likewise, the second angled surface interfaces with the angled surface of the second projection 120b of the tire 105 at a second interface 140b. In the illustrated embodiment, the angled surfaces are smooth surfaces. In an alternative embodiment (not shown), each angled surface may include multiple surfaces at different angles. In another alternative embodiment (not shown), one or more rounded or curved surface may be employed instead of the angled surfaces. It should also be understood that the size and location of the angled surfaces may be varied.

In the illustrated embodiment, the shape of each angled surface of the wheel 135 corresponds to the shape of each projection 120a,b of the tire 105. In alternative embodiments, the surfaces may be different. For example, one of the surfaces may be curved, while the other is straight, or one of the surfaces may be smooth while the other includes multiple surfaces at multiple angles.

The assembly 100 also includes a plurality of fasteners 145. In the illustrated embodiment, each fastener 145 is a rod having threaded ends. The rod extends through corresponding apertures in a pair of fastener rings 150, in each of the sidewalls 115a,b, and in the wheel 135. Each end of the rod is secured by a threaded nut or cap. In an alternative embodiment (not shown), other fasteners such as screws or rivets may be employed. While the fasteners 145 are shown as passing entirely through both sidewalls 115a,b and the wheel 135, it should be understood that some or all of the fasteners may only pass through one sidewall and a portion of the wheel.

To assemble the tire 105 and the wheel 135 with the fasteners 145 and the fastener ring 150, 10 to 200 pounds (40 to 800 Newtons) of force is applied by the fasteners 145 to secure the components together. However, it should be understood that any amount of force may be used. The fastener rings 150 aid in aligning the fasteners 145 and in equalizing the distribution of force exerted by the fasteners 145.

When the fasteners 145 apply force to the fastener rings 150, the fastener rings transfer the force to the sidewalls 115a,b, which in turn transfer the force to the wheel 135 through the projections 120a,b. The fasteners 145 apply a substantially axial force. However, because the projection 120a,b engage the wheel 135 through angled interfaces, the force transferred by the projections 120a,b includes both an axial and a radial component. In the illustrated embodiment, as the projections 120a,b are moved inward, they push the angled surfaces of the wheel 135 upward. In other words, the projections 120a,b apply a tensile force to the wheel 135.

The assembly 100 further includes a tread profile shaper 155 disposed under the tread 100. The tread profile shaper 155 includes a concave portion 160 extending from the first sidewall 115a to the second sidewall 115b. The tread profile shaper 155 also includes an upper portion 165 extending from the concave portion 160 and connected to the circumferential tread 110. In the illustrated embodiment, the upper portion 165 of the tread profile shaper 155 directly contacts the tread 110. In alternative embodiments (not shown) other components may be disposed between the tread and the tread profile shaper.

The sidewalls 115a,b may provide a compressive force on the concave portion 160, which in turn pushes the upper portion 165 upward against the tread 110. The amount of force provided by the sidewalls 115a,b and the size and shape of the tread profile shaper 155 may be selected to provide a desired footprint of the tread 110 as it engages the ground or other rolling surface. For example, it may be desirable to apply upward force at the center of the tread 110 to create a rounded footprint. In an alternative embodiment (not shown), the tread profile shaper may be omitted.

Figure 4:
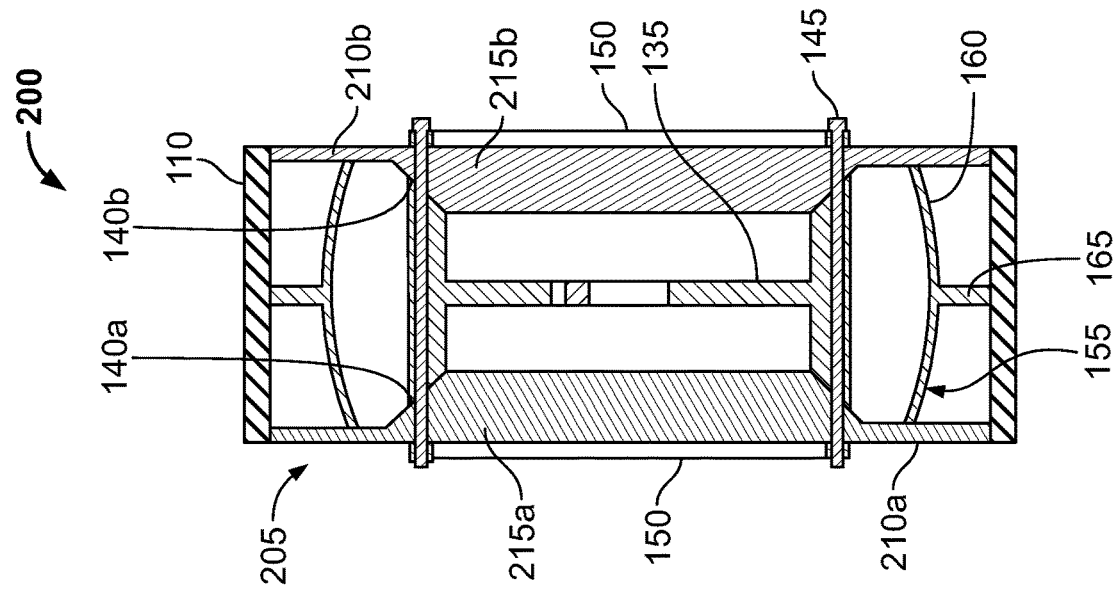
FIG. 4 is a cross-section of the tire and wheel assembly 200.
Figure 3:
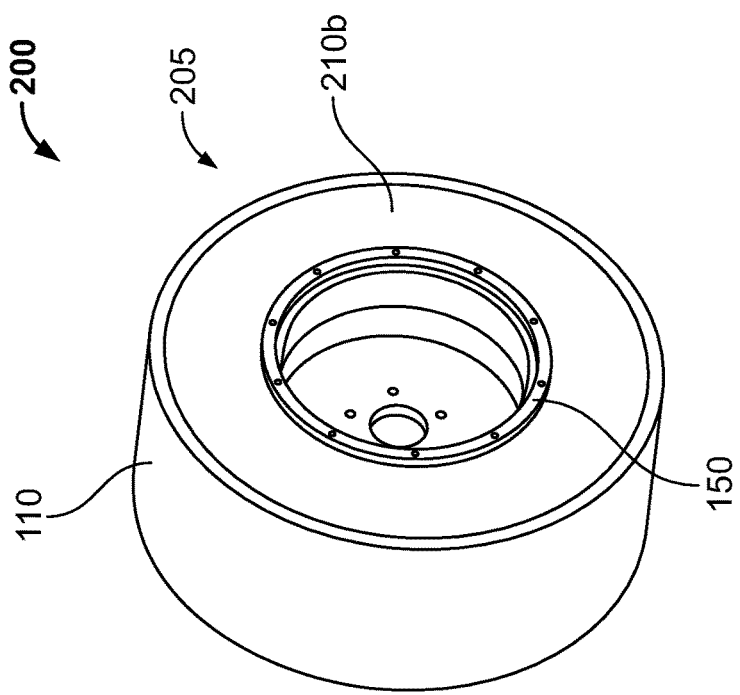
FIG. 3 is a perspective view of an alternative embodiment of a tire and wheel assembly 200.

FIGS. 3 and 4 provide a perspective view and cross-section, respectively, of an alternative embodiment of a tire and wheel assembly 200. The assembly 200 is substantially similar to the assembly 100 shown in FIGS. 1 and 2 and described above (including the alternative embodiments discussed), except for the difference described herein. Like reference numerals are used for like components.

The assembly 200 includes a tire 205 having a circumferential tread 110 and a pair of solid spaced apart sidewalls—including a first solid sidewall 210a and a second solid sidewall 210b—that extend downwardly from the circumferential tread 110. The solid sidewalls 210a,b may be constructed of the same materials described with respect to sidewalls 115a,b of assembly 100, but do not include openings or spokes.

Each of the solid sidewalls 210a,b has an outer surface and an inner surface. A first projection 215a extends inwardly from the inner surface of the first solid sidewall 210a, and a second projection 215b extends inwardly from the inner surface of the second solid sidewall 210b. In the illustrated embodiment, the first projection 215a is substantially symmetric to the second projection 215b. In an alternative embodiment (not shown), the first projection and the second projection may have different shapes, sizes, or locations.

The first and second projections 215a,b abut the angled surfaces of the wheel 135 and apply a tensile force to the wheel in the same manner as the projections 120a,b of the tire 105 described above.

While the illustrated embodiments show tires having substantially symmetric sidewalls, it should be understood that each sidewall may have a different face. For example, one sidewall may be solid while the other has openings.

Figure 6:
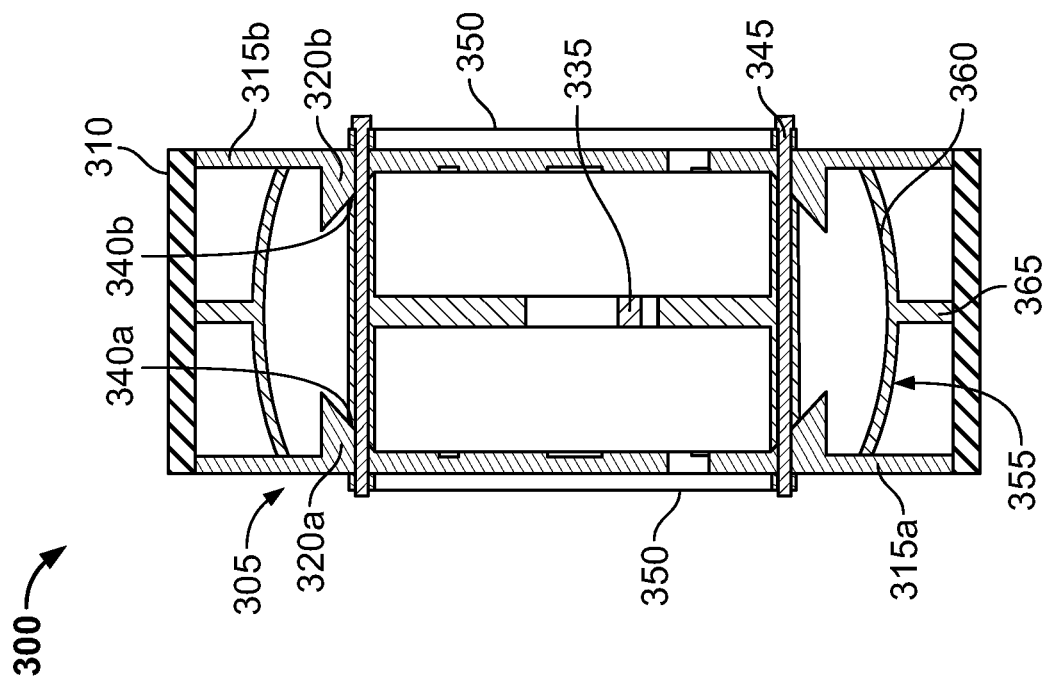
FIG. 6 is a cross-section of the tire and wheel assembly 300.
Figure 5:
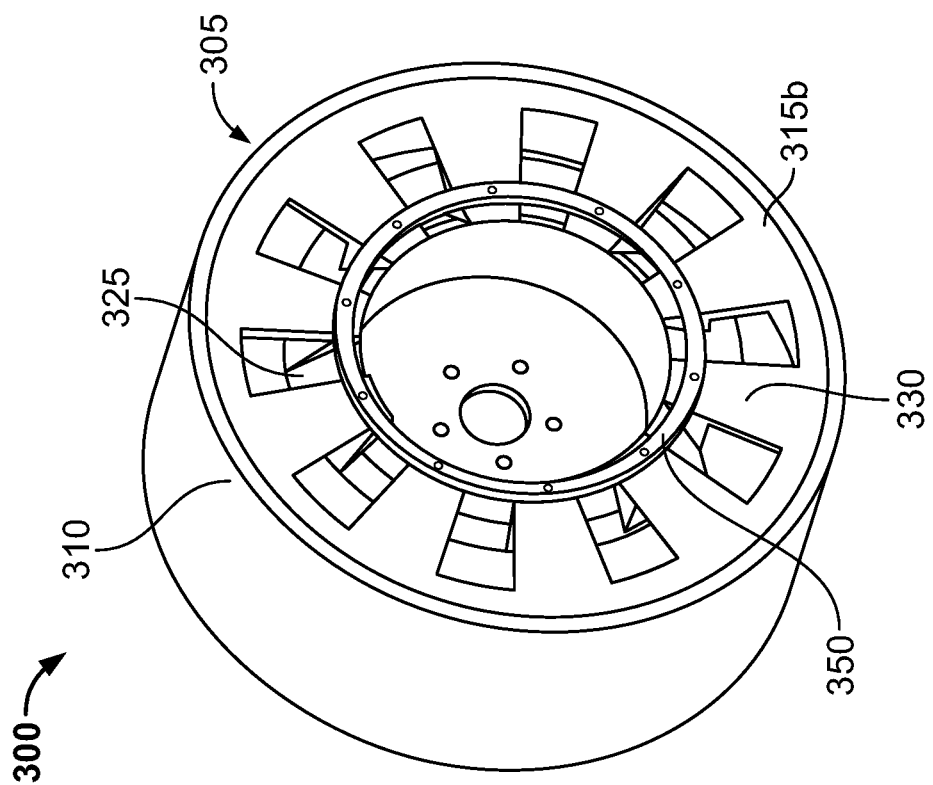
FIG. 5 is a perspective view of another alternative embodiment of a tire and wheel assembly 300.

FIGS. 5 and 6 provide a perspective view and cross-section, respectively, of another alternative embodiment of a tire and wheel assembly 300. The assembly 300 includes a tire 305 having a circumferential tread 310 and a pair of spaced apart sidewalls—including a first sidewall 315a and a second sidewall 315b—that extend downwardly from the circumferential tread 110. The tread 310 and sidewalls 315a,b may be constructed of the same materials as described above for the tread 110 and sidewalls 115a,b of the tire 105 of FIGS. 1 and 2.

In the illustrated embodiment, the sidewalls 315a,b are in direct contact with the tread 310. In an alternative embodiment (not shown), other components or layers of materials may be disposed between the tread and the sidewalls or embedded in the tread. For example, reinforcement structures (such as those described above with respect to tire 105) may be disposed between the tread and the sidewalls or embedded in the tread.

Each of the sidewalls 315a,b has an outer surface and an inner surface. A first projection 320a extends inwardly from the inner surface of the first sidewall 315a, and a second projection 320b extends inwardly from the inner surface of the second sidewall 315b. In the illustrated embodiment, the first projection 320a is substantially symmetric to the second projection 320b. In an alternative embodiment (not shown), the first projection and the second projection may have different shapes, sizes, or locations.

Both the first and second projections 320a,b have angled surfaces. In the illustrated embodiment, an upper end of each projection is longer than a lower end, and the angled surface of each projection extends smoothly from the upper end to the lower end. In an alternative embodiment (not shown), multiple angled portions may extend from the upper end to the lower end. In another alternative embodiment (not shown), one or more rounded or curved surface may extend from the upper end to the lower end.

The sidewalls 315a,b also include a plurality of openings 325. In the illustrated embodiment, the openings 325 are elongated openings spaced about each sidewall 315a,b and define a plurality of spokes 330 having free lower ends. Because the lower ends of the spokes 330 are not connected to each other, the spokes 330 are more flexible than if the lower ends were connected. In an alternative embodiment (not shown), the openings are cutouts, and the lower ends of the spokes are connected to each other. In another alternative embodiment (not shown), the openings are not spaced so as to define a plurality of spokes.

In the illustrated embodiment, each spoke 330 may be described as having a separate projection 320a,b. In other words, the first projection 320a and the second projection 320b may each be described as being a plurality of projections. Alternatively, the first and second projections 120a,b in the illustrated embodiment may each be referred to as being a single, non-continuous projection.

The assembly 300 also includes a wheel 335. The wheel 335 includes a first angled surface on a first side and a second angled surface on a second side. In the illustrated embodiment, the angled surfaces are chamfers about the circumference on each side of the wheel 335. In an alternative embodiment (not shown), the angled surface may define a groove in a wheel.

The first angled surface of the wheel 335 abuts the angled surface of the first projection 320a of the tire 305 at a first interface 340a. Likewise, the second angled surface abuts the angled surface of the second projection 320b of the tire 305 at a second interface 340b. In the illustrated embodiment, the angled surfaces are smooth surfaces. In an alternative embodiment (not shown), each angled surface may include multiple surfaces at different angles. In another alternative embodiment (not shown), one or more rounded or curved surface may be employed instead of the angled surfaces. It should also be understood that the size and location of the angled surfaces may be varied.

In the illustrated embodiment, the shape of each angled surface of the wheel 335 corresponds to the shape of each projection 320a,b of the tire 305. In alternative embodiments, the surfaces may be different. For example, one of the surfaces may be curved, while the other is straight, or one of the surfaces may be smooth while the other includes multiple surfaces at multiple angles.

The assembly 300 also includes a plurality of fasteners 345. In the illustrated embodiment, each fastener 345 is a rod having threaded ends. The rod extends through corresponding apertures in a pair of fastener rings 350, in each of the sidewalls 315a,b, and in the wheel 335. Each end of the rod is secured by a threaded nut or cap. In an alternative embodiment (not shown), other fasteners such as screws or rivets may be employed. While the fasteners 345 are shown as passing entirely through both sidewalls 315a,b and the wheel 335, it should be understood that some or all of the fasteners may only pass through one sidewall and a portion of the wheel.

To assemble the tire 305 and the wheel 335 with the fasteners 345 and the fastener ring 350, 10 to 20 pounds (40 to 80 Newtons) of force is applied by the fasteners 345 to secure the components together. However, it should be understood that any amount of force may be used. The fastener rings 350 aid in aligning the fasteners 345 and in equalizing the distribution of force exerted by the fasteners 345.

When the fasteners 345 apply force to the fastener rings 350, the fastener rings transfer the force to the sidewalls 315a,b, which in turn transfer the force to the wheel 335 through the projections 320a,b. The fasteners 345 apply a substantially axial force. However, because the projection 320a,b engages the wheel 335 through angled interfaces, the force transferred by the projections 320a,b includes both an axial and a radial component. In the illustrated embodiment, as the projections 320a,b are moved inward, they push the angled surfaces of the wheel 335 downward. In other words, the projections 320a,b apply a compression force to the wheel 335.

The assembly 300 further includes a tread profile shaper 355 disposed under the tread 300. The tread profile shaper 355 is substantially the same as the tread profile shaper 155 of assembly 100 shown in FIGS. 1 and 2, including the alternative embodiments discussed above. Specifically, in the illustrated embodiment, the tread profile shaper 355 includes a concave portion 360 extending from the first sidewall 315a to the second sidewall 315b, and an upper portion 365 extending from the concave portion 360 and connected to the circumferential tread 310.

Figure 8:
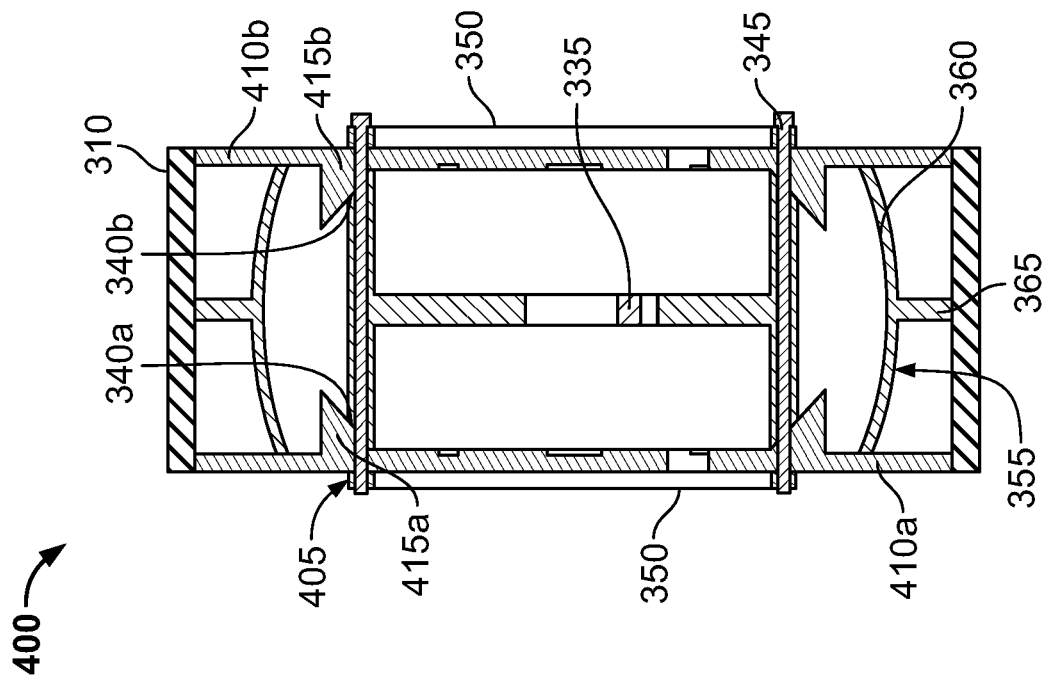
FIG. 8 is a cross-section of the tire and wheel assembly 400.
Figure 7:
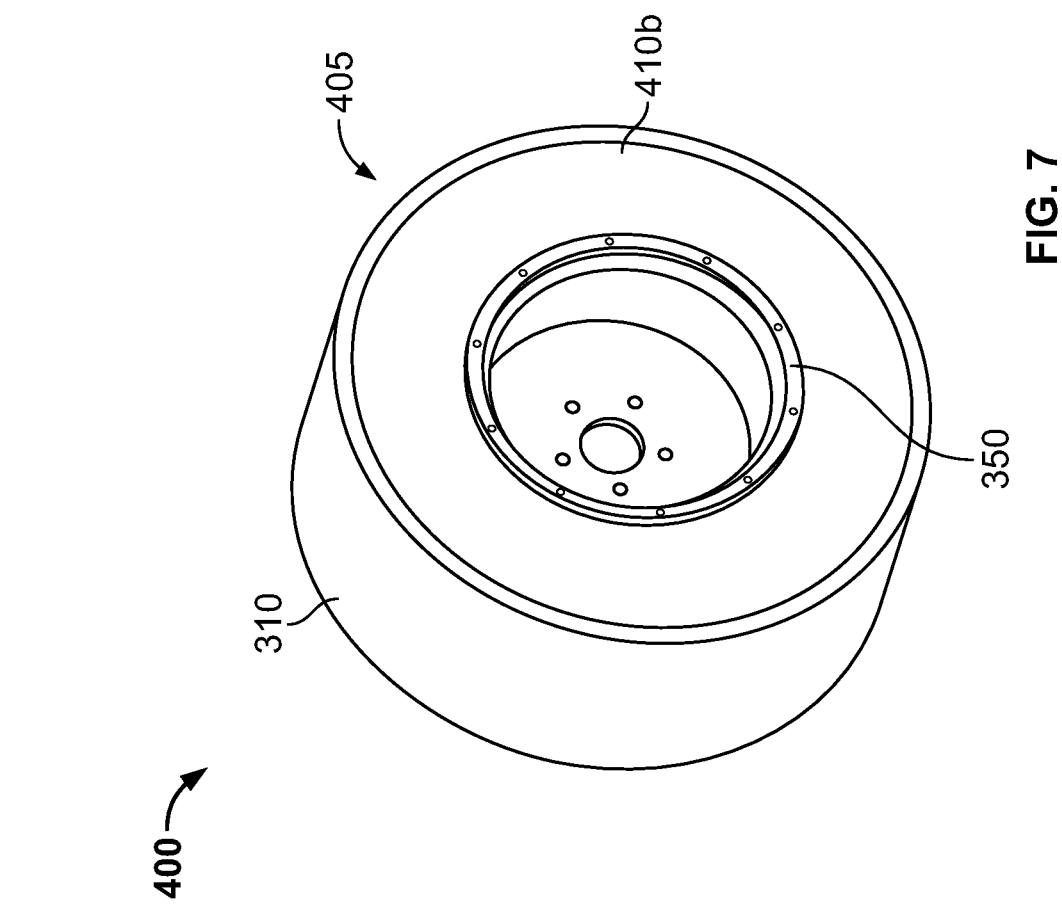
FIG. 7 is a perspective view of yet another alternative embodiment of a tire and wheel assembly 400.

FIGS. 7 and 8 provide a perspective view and cross-section, respectively, of an alternative embodiment of a tire and wheel assembly 400. The assembly 400 is substantially similar to the assembly 300 shown in FIGS. 5 and 6 and described above (including the alternative embodiments discussed), except for the difference described herein. Like reference numerals are used for like components.

The assembly 400 includes a tire 405 having a circumferential tread 310 and a pair of solid spaced apart sidewalls—including a first solid sidewall 410a and a second solid sidewall 410b—that extend downwardly from the circumferential tread 310. The solid sidewalls 410a,b may be constructed of the same materials described with respect to sidewalls 315a,b of assembly 300, but do not include openings or spokes.

Each of the solid sidewalls 410a,b has an outer surface and an inner surface. A first projection 415a extends inwardly from the inner surface of the first solid sidewall 410a, and a second projection 415b extends inwardly from the inner surface of the second solid sidewall 410b. In the illustrated embodiment, the first projection 415a is substantially symmetric to the second projection 415b. In an alternative embodiment (not shown), the first projection and the second projection may have different shapes, sizes, or locations.

The first and second projections 415a,b abut the angled surfaces of the wheel 335 and apply a tensile force to the wheel in the same manner as the projections 320a,b of the tire 305 described above.

While the illustrated embodiments show tires having substantially symmetric sidewalls, it should be understood that each sidewall may have a different face. For example, one sidewall may be solid while the other has openings.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire and wheel assembly comprising:
   a non-pneumatic tire including:
      a circumferential tread, and
      a pair of spaced apart sidewalls extending downwardly from the circumferential tread, each of the sidewalls having an outer surface, an inner surface, and a projection extending inwardly from the inner surface, wherein the projection has an angled surface;
   a wheel having a pair of sides, each side including an angled surface abutting the angled surface of the projection of a corresponding sidewall;
   a plurality of fasteners, each fastener extending through at least one sidewall and at least a portion of the wheel; and
   a tread profile shaper disposed below the circumferential tread in a cavity defined by the circumferential tread and the pair of spaced apart sidewalls, wherein a gap separates at least a portion of the tread profile shaper from the circumferential tread.

2. The non-pneumatic tire and wheel assembly of claim 1, wherein a lower end of each projection is longer than an upper end, and the angled surface of each projection extends smoothly from the lower end to the upper end.

3. The non-pneumatic tire and wheel assembly of claim 2, wherein each projection exerts an upward, tensile force on the wheel.

4. The non-pneumatic tire and wheel assembly of claim 1, wherein an upper end of each projection is longer than a lower end, and the angled surface of each projection extends smoothly from the upper end to the lower end.

5. The non-pneumatic tire and wheel assembly of claim 4, wherein each projection exerts a downward, compressive force on the wheel.

6. The non-pneumatic tire and wheel assembly of claim 1, wherein each of the plurality of fasteners extends through both of the spaced apart sidewalls.

7. The non-pneumatic tire and wheel assembly of claim 1, further comprising a pair of fastener rings, wherein each fastener ring is connected to an outer surface of a sidewall, and wherein each fastener ring receives at least some of the plurality of fasteners.

8. The non-pneumatic tire and wheel assembly of claim 1, wherein the tread profile shaper includes a concave portion extending from a first sidewall of the pair of spaced apart sidewalls to a second sidewall of the pair of spaced apart sidewalls.

9. The non-pneumatic tire and wheel assembly of claim 1, wherein the tread profile shaper further includes an upper portion extending from a concave portion and connected to the circumferential tread.

10. The non-pneumatic tire and wheel assembly of claim 9, wherein the upper portion of the tread profile shaper is in direct contact with the circumferential tread.

11. The non-pneumatic tire and wheel assembly of claim 1, wherein each of the pair of spaced apart sidewalls includes a plurality of openings that define a plurality of spokes.

* * * * *